No. 836,696. PATENTED NOV. 27, 1906.
F. E. MORGAN.
TRAP FOR CONDENSED MATTER IN GAS PIPES.
APPLICATION FILED AUG. 2, 1905.
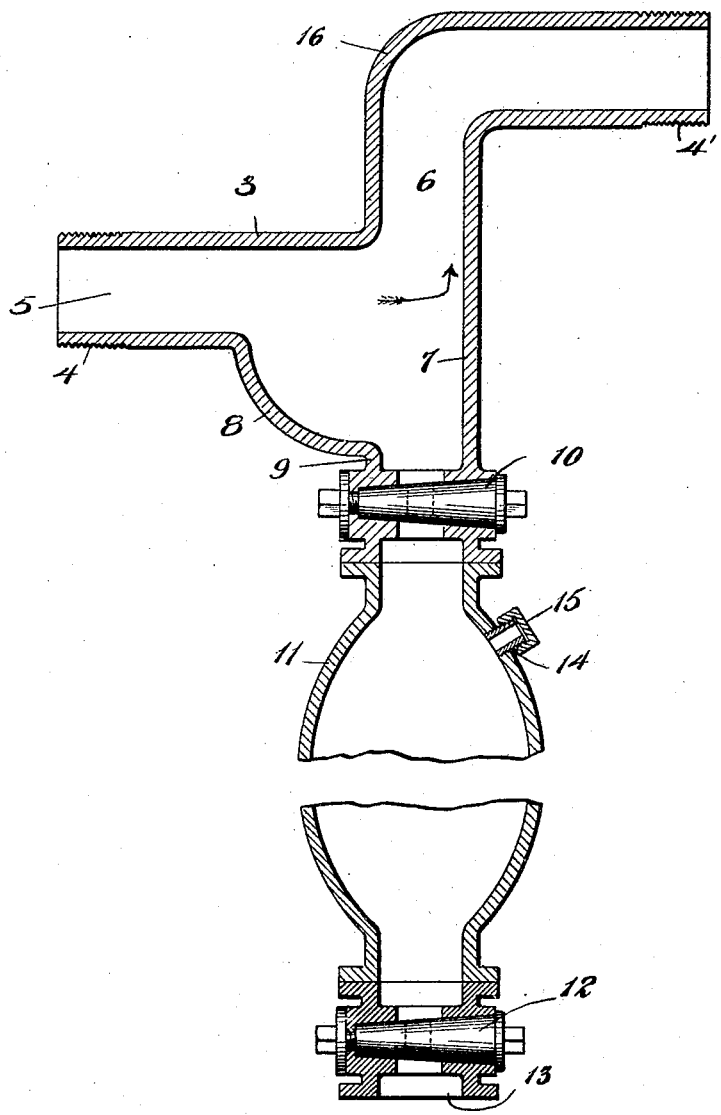
WITNESSES:
INVENTOR
Francis E. Morgan
BY
ATTORNEY

UNITED STATES PATENT OFFICE.

FRANCIS E. MORGAN, OF BROOKLYN, NEW YORK.

TRAP FOR CONDENSED MATTER IN GAS-PIPES.

No. 836,696.　　　　Specification of Letters Patent.　　　Patented Nov. 27, 1906.

Application filed August 2, 1905. Serial No. 272,276.

*To all whom it may concern:*

Be it known that I, FRANCIS E. MORGAN, a citizen of the United States, and a resident of Brooklyn, in the county of Kings and State of New York, have invented certain new and useful Improvements in Traps for Condensed Matter in Gas-Pipes, of which the following is a specification.

This invention relates to devices for trapping and collecting or disposing of water and the more or less viscous liquid matter resulting from condensation which accumulates in the house-mains and in the meters of a system of illuminating-gas distribution, often to the extent of entirely choking off the supply of gas. The increasing production and use of what is known as "water-gas," with which, particularly in very cold weather, there is invariably a comparatively large condensation of water and other surplus vapors in spite of the provision of devices at "stations" in the street-mains to withdraw or divert these products of condensation, increases the danger and risk attendant upon the use of gas for illuminating and other domestic purposes. It is well known that a distributing-pipe is often temporarily choked in this manner while the gas is being used, resulting in the extinguishment of the flame, whereupon should increased pressure or other cause wholly or partially free the pipe of the impediment the unconsumed poisonous and inflammable gas will flow directly into the room, endangering life and property.

I have indicated that I am aware of the fact that stations are generally provided at intervals in the street-mains which are equipped with devices intended to take up and discharge as large a proportion as possible of the accumulating condensed matter; but in spite of this provision there is nevertheless no inconsiderable volume of uncondensed vapors which passes these stations, and therefore further condensation between these stations and the points of final discharge. The desirability of insuring against the dire results which might follow this additional condensation gave birth to the present invention, which has for its general object the provision of a very simple device designed to be located in the house-main, preferably on the street side of and near the meter, which will arrest or check the products of condensation—if desired, also, facilitating condensation at that point—and store such products for easy removal from time to time.

In the present invention it is sought to take advantage of the fact that these products of condensation are of higher specific gravity than the pure inflammable gaseous compound, and therefore have a tendency, particularly when the gas is at rest, to settle on the bottom of the pipe.

My invention, therefore, consists generally in providing at any desired point a suitable depression in the supply-pipe into which the liquid products of condensation may drain and being withdrawn from the path of movement of the gas be checked and accumulate, with means permitting the removal of such products from time to time as desired.

My invention further consists in the novel form of receptacle for such products the contents of which may be withdrawn without permitting the escape of gas therewith.

My invention further consists in means for deflecting or changing the direction of flow of the gas at or near the trap or receiving-cup, not only tending to prevent the liquid products of condensation being carried beyond the trap or cup on account of the velocity of the gas which provides a vehicle therefor, but to facilitate condensation at that point.

My invention further consists in various novel details of construction and in combination of parts, all as hereinafter described, and particularly pointed out in the claim.

My invention will be more readily understood by reference to the accompanying drawing, forming a part of this specification, in which the figure is a central sectional elevation of a portion of a gas-main with my invention applied thereto.

Referring now to the drawing in detail, numeral 3 refers to a pipe-fitting designed to interpose sections of the house-main, being preferably located on the street side of and near the meter. This fitting is preferably of cast-iron and is provided at either end with means, such as the screw-threads 4 and 4' for pipe-couplings, for effecting its union with contiguous pipe-sections and provide a continuous sealed conduit. There are in the preferred construction, as shown in the drawing, two bends or elbows in this fitting 3, providing for an abrupt change in direction of flow of the gas (as indicated by the arrow) with final discharge, if desired, in the same direction. The channel 5 therefore has an upward bend 6, and a substantially perpendicular wall 7 is provided, against which the current of gas is directed. At the base of this wall 7 I have shown the bottom wall of the fitting depressed to form a cup or open receptacle 8, into which all liquid matter carried along by the gas in transit may drain and accumulate. This cup 8 should be tapering or substantially funnel-shaped, terminating in a pipe or cylindrical portion 9, in which I provide a valve or cork 10 of any common and well-known pattern. Connected in any suitable manner to the open end of the pipe or cylindrical portion 9 is the preferably bulbous-shaped fitting 11, which is designed to provide merely an auxiliary receptacle to increase the total storage capacity and permit of the drawing off of the accumulated refuse matter without loss of gas. To the latter end I provide another valve or cock 12 of any desired pattern at the final discharge-opening 13 of the auxiliary container 11. The valve 10 is normally open, while the valve 12, of course, is closed. When it is desired to remove the refuse liquid matter from the container, the valve 10 is first closed to prevent the escape of gas and the valve 12 opened to draw off the contents. As these products of condensation are often viscous or become so after a short time, I prefer to provide the auxiliary container 11 with a vent 14 near the top thereof, having a removable cap 15, which may be opened to permit entrance of air to effect discharge either by gravity or by augmenting normal atmospheric pressure.

A current of illuminating-gas under high pressure may provide a vehicle which will carry suspended therein in a horizontal direction minute particles of liquid matter which it is desired to eliminate, but be insufficient to elevate such particles. Therefore, the upward bend of the fitting 3 tends to arrest movement of such matter, which will fall into the cup 8. Furthermore, the gas being directed against the wall 7 and the impetus of the liquid particles being greater than that of the gas—owing to their higher specific gravity—they will impinge against said wall, where they will be held by capillary attraction and gravity against the current and increasing weight and finally effect their flow into the cup 8.

It will be apparent that the final change in the direction of flow of the gas provided by the elbow or bend 16 is not essential to the present invention. In fact, the greater the vertical distance through which the gas is carried the greater the precipitation of liquid matter. It is assumed, however, that this fitting is most conveniently and effectively installed by interposing the same between lengths of horizontal pipes, as that portion of the house-main leading to the meter is usually disposed, and therefore substantially parallel paths of ingress and egress are desirable and the second bend necessary.

Many modifications of the minor details of the device shown and described as a convenient embodiment of my invention will doubtless readily suggest themselves to those skilled in the art to which it appertains, and I therefore do not desire to limit my invention to the specific construction herein shown and described.

Having thus described my invention, I claim as new and desire to secure by Letters Patent—

1. A gas-pipe fitting comprising a section of pipe having a substantially horizontal portion and a substantially vertical portion, a reservoir, and a valved drain in the horizontal portion of said pipe, located at the base of said vertical portion and leading directly into said reservoir.

2. A gas-pipe fitting comprising a section of pipe having a substantially horizontal portion and a substantially vertical portion, a reservoir below said pipe, a drain from the bottom of said pipe at the base of said vertical portion leading directly into said reservoir, a drain from said reservoir, and valves controlling ingress to and egress from said reservoir.

3. A gas-pipe fitting comprising a section of pipe having a substantially horizontal portion and a substantially vertical portion, a reservoir below said pipe, a drain from the bottom of said pipe at the base of said vertical portion leading directly into said reservoir, a drain from said reservoir, and valves controlling ingress to and egress from said reservoir, a vent in said reservoir, and means for closing and opening said vent.

In testimony of the foregoing I have hereunto set my hand in the presence of two witnesses.

FRANCIS E. MORGAN.

Witnesses:
   FRED H. BOWERSOCK,
   A. C. DEMEUSY.